(12) United States Patent
Ledbetter

(10) Patent No.: US 8,896,162 B1
(45) Date of Patent: Nov. 25, 2014

(54) DEVICE FOR INSTALLING AND/OR REMOVING COMPONENTS FROM ELECTRICAL EQUIPMENT

(76) Inventor: Finley Lee Ledbetter, Argyle, TX (US)

( * ) Notice: Subject to any disclaimer, the term of this patent is extended or adjusted under 35 U.S.C. 154(b) by 660 days.

(21) Appl. No.: 13/247,899

(22) Filed: Sep. 28, 2011

Related U.S. Application Data

(63) Continuation-in-part of application No. 12/784,681, filed on May 21, 2010, now Pat. No. 8,466,584.

(51) Int. Cl.
*B25J 9/16* (2006.01)

(52) U.S. Cl.
USPC .............. 307/236; 901/2; 901/11; 901/31; 901/41

(58) Field of Classification Search
CPC .......... B25J 9/0084; B25J 9/0087; B25J 9/10; B25J 9/16
USPC ............................ 307/326; 901/2, 11, 31, 41
See application file for complete search history.

(56) References Cited

U.S. PATENT DOCUMENTS

| | | | |
|---|---|---|---|
| 4,713,501 A | 12/1987 | Herrmann | |
| 5,330,213 A | 7/1994 | Peruso | |
| 5,397,869 A | 3/1995 | Huen | |
| 5,465,031 A | 11/1995 | Nilssen | |
| 5,477,017 A | 12/1995 | Swindler et al. | |
| 6,404,620 B1 | 6/2002 | Piccione | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 7,804,201 B1 | 9/2010 | Ledbetter | |
| 7,825,344 B2 | 11/2010 | Stevenson | |
| 8,164,875 B1* | 4/2012 | Ledbetter et al. | 361/115 |
| 8,228,225 B1* | 7/2012 | Ledbetter et al. | 341/176 |
| 8,294,304 B1* | 10/2012 | Ledbetter et al. | 307/125 |
| 8,390,975 B1* | 3/2013 | Ledbetter et al. | 361/115 |
| 2003/0200648 A1 | 10/2003 | Greer | |
| 2005/0194243 A1 | 9/2005 | Pineppi | |
| 2010/0024191 A1 | 2/2010 | Ledbetter | |
| 2011/0208355 A1* | 8/2011 | Tsusaka | 700/246 |
| 2013/0231779 A1* | 9/2013 | Purkayastha et al. | 700/259 |

* cited by examiner

*Primary Examiner* — Adi Amrany
(74) *Attorney, Agent, or Firm* — Gardere Wynne Sewell LLP

(57) ABSTRACT

A robot for operating isolation switches while allowing an operator to remain outside of an arc flash zone can include a motor, bidirectional rotatable shaft, gear box, and magnet housings with magnets for engaging with metal. A first arm can be connected to the bidirectional rotatable shaft and can have a gripper. A second arm can connect to the bidirectional rotatable shaft, and can have a threadable member for depressing an interlock on the isolation switches. Stops can prevent the first arm from over-rotating. A magnetically securable controller portion can be in communication with a motor portion and remote switch operator. A remote control device can operate the remote switch operator to control and power the controller portion to operate the motor outside of the arc flash zone.

15 Claims, 5 Drawing Sheets

DEVICE FOR INSTALLING AND/OR REMOVING COMPONENTS FROM ELECTRICAL EQUIPMENT

CROSS REFERENCE TO RELATED APPLICATIONS

The present application is a continuation in part and claims priority to and the benefit of co-pending U.S. patent application Ser. No. 12/784,681 filed on May 21, 2010, entitled "PORTABLE CHARGE CLOSE TRIP DEVICE", which is incorporated herein in its entirety.

FIELD

The present embodiments generally relate to a magnetically attachable robot for operation on isolation switches configured to allow an operator to remain outside of an arc flash zone.

BACKGROUND

A need exists for a simple lightweight magnetically attachable robot usable with switch gears.

The present embodiments meet these needs.

BRIEF DESCRIPTION OF THE FIGURES

The detailed description will be better understood in conjunction with the accompanying drawings as follows.

Figure 1:
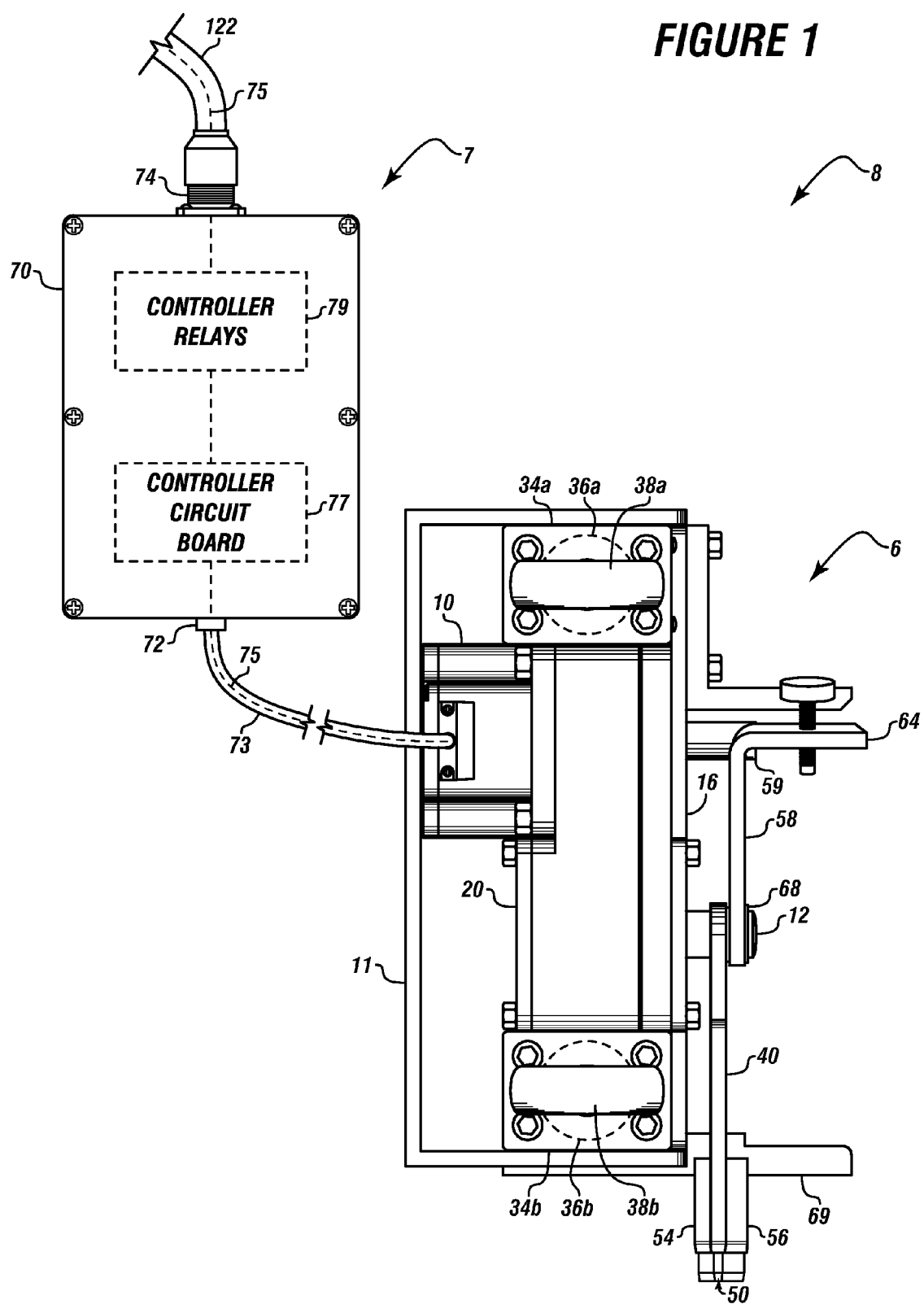
FIG. 1 depicts a top view of a robot according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a robot that can be an isolation switch operator. The robot can be a remote controlled robot.

The robot can be lightweight and have a plurality of modular components that are connectable together. For example, the robot can include an RSA assembly having a motor portion in communications with a controller portion through a gear box power and signal cable, and a remote control device engaged with the controller portion.

The robot can be used to operate on 5 kilovolt (kV) isolation switches, such as motor starters in a refinery or on an oil rig.

Use of the robot can allow operators to remain safely outside of an arc flash zone of the motor starters; thereby reducing the risk of electrocution. The operator can view the robot during operation from a safe and comfortable distance, such as in an air-conditioned or heated room.

For example, during operation of the robot on the motor starter, an electrical arc flash can occur, which can cause injury and/or death to people within a limited physical distance around the occurrence of the arc flash. The robot can allow the operator to perform work without entering the arc flash zone; thereby increasing safety and protecting lives.

In one or more embodiments, the motor portion can weigh from about 5 pounds to about 20 pounds.

The motor portion can include a motor with a motor mount plate mounted thereto.

The motor can be an ORIENTAL MOTOR™, such as model BLH450KC. The motor can be a variable speed motor with variable acceleration or another motor.

A gear box can be attached to the motor. The gear box can be an ORIENTAL MOTOR™ gear box, such as model FR-200. The motor and gear box can operate on DC 12 volt power.

A bidirectional rotatable shaft can be operatively engaged with the motor and the gear box. The bidirectional rotatable shaft can be a solid metal rod with a length ranging from about 2 inches to about 8 inches, and can fit within the gear box. The bidirectional rotatable shaft can be a hollow metal rod surrounded by an insulator, such as a plastic or a urethane insulator.

The gear box power and signal cable can be in communication with the motor and the controller portion. The gear box power and signal cable can provide bidirectional signals and communicate DC power, such as 12 volt current, to the motor.

In one or more embodiments, the motor portion can have a housing that can contain both the motor and gear box. The housing can be supported by the motor mount plate. In one or more embodiments, the housing can be aluminum.

The robot can include a plurality of magnet housings, each of which can allow the robot to be removably attached with the switch gear. Each magnetic housing can be shielded, such that magnetic force only extends in the direction of the switch gear and in no other direction.

The magnet housings can be made of non-magnetic metal. Each magnet housing can have a magnet disposed therein. Each magnet can be a non-electric magnet, such as a rare earth magnet.

Each magnet can be rotated out of and into the magnet housings, such as by using a rotatable handle. The rotatable handles can be configured to rotate and extend the magnets from the magnet housings to engage with a metal surface and/or a magnetic surface surrounding an isolation switch. The magnet faces can extend from the magnetically shielded magnet housings to hold the motor portion to the metal surface adjacent the isolation switch.

In embodiments, the rotatable handles can be spring loaded for applying an outward pressure to the magnets; thereby ensuring a flush and secure engagement between the magnets and the metal surface and/or the magnetic surface.

The motor portion can have a first arm with a first arm body. The first arm can have a first arm shaft end connected to the bidirectional rotatable shaft.

In one or more embodiments, the first arm can have a length ranging from about 4 inches to about 12 inches, width ranging from about ¼ of an inch to about ¾ of an inch, and thickness ranging from about ⅛ of an inch to about ¼ of an inch.

The first arm can have a first arm body end, which can form a first arm engagement portion. The first arm engagement portion can be C-shaped.

A gripper, which can be one-piece rubber or urethane based gripper, can be slid over or otherwise engaged about the first arm engagement portion. The gripper can be made of a non-conductive material, which can be impact resistant. For example, the gripper can be made of molded DEELRIN™ or another durable polyamide.

In one or more embodiments, the gripper can be a two-piece structure, including a first gripper that can be fastened to one side of the first arm engagement portion and a second gripper that can be fastened to the other side of the first arm engagement portion.

For example, the first gripper can be disposed around the first arm engagement portion on a front side of the first arm, and the second gripper can be disposed around the first arm engagement portion on a back side of the first arm.

The gripper can be C-shaped and can entirely or at least partially overlay an edge of the first arm engagement portion.

The gripper can be made of a non-conductive, rigid, and impact-resistant material configured to engage electrical equipment without causing damage thereto.

The robot can include a second arm which can have a second arm body with a second arm shaft end connected to the bidirectional rotatable shaft.

The second arm can have an extension projecting from the second arm body and a threadable member disposed through the extension.

The extension of second arm can be welded to the second arm and made of the same material as the second arm body. The extension can project from the second arm body by a distance ranging from about 1 inch to about 3 inches.

The threadable member of the second arm can be a screw attached to a knob, a thumb a screw, or the like. The threadable member can be removable from the extension.

The threadable member can have a threaded portion that can be from about 1 inch to about 3 inches long. The threadable member can depress a component on the isolation switch, such as an interlock of the isolation switch.

In one or more embodiments, the second arm can have a length ranging from about 4 inches to about 12 inches, width ranging from about ¼ of an inch to about 2 inches, and thickness ranging from about ⅛ of an inch to about ¼ of an inch.

The first arm and second arm can be made of powder coated steel, rigid reinforced plastic, a rigid material configured to be non-deformable in the presence of a temperature of about 105 degrees Fahrenheit, or a material having a melting temperature above about 180 degrees Fahrenheit.

In one or more embodiments, an arm fastener can hold the first arm and second arm to the bidirectional rotatable shaft. The arm fastener can include a bolt, nut, and washer. The bolt can have a length ranging from about 4 inches to about 6 inches, providing a lightweight construction for the motor portion.

A first stop can project from a first side of the motor mount plate. The first stop can be configured to engage the first arm to prevent of the first arm from rotating past the first stop. The first stop can be positioned to support one of the plurality of magnet housings.

In one or more embodiments, the motor mount plate and first stop can both be made of rigid aluminum, providing lightweight rigorous support to the motor and the first arm.

A second stop can project from the motor mount plate. The second stop can be configured to engage the first arm to prevent the first arm from rotating past the second stop. In one or more embodiments, the second stop can be a solid metal rod projecting from a portion of the motor mount plate opposite the motor, and can have sufficient rigidity to prevent rotation of the first arm past a predetermined limit.

The controller portion can be connected to the motor portion with the gear box power and signal cable, and can transmit the power and control signals to the motor and gear box.

The gear box power and signal cable can be a bidirectional cable that can provide DC power, such as 12 volt current, to the controller portion.

The controller portion can include a housing, and can weigh less than 5 pounds. For example, one or more embodiments of the controller portion can weigh from about 0.3 pounds to about 3 pounds. The housing can be made of aluminum.

The controller portion can include a controller for providing power and control signals to the motor portion.

The controller portion can include a circuit board and one or more relays.

The controller portion can function to pass control signals from a radio remote, wired pendant station, or remote switch operator (RSO), also referred to as a remote control assembly.

The controller portion can transmit power signals to and from the RSO, which can in-turn be connected and controlled by the wired pendant station or radio remote with control buttons.

A controller magnet can be disposed on the controller and can be configured to attach the controller to the metal surface and/or magnetic surface proximate the motor portion. The controller magnet can be a rare earth type magnet. The controller magnet can be circular for providing a secure engagement with the metal surface and/or magnetic surface near the isolation switch.

A power and signal-out interface plug can be in the controller to provide power and control signals from the controller to the motor portion through the gear box power and signal cable.

A power and signal-in interface plug can be in the controller for receiving the power and control signals from the remote control assembly through the power and signal cable, which can be in communication between the remote switch operator and the controller portion.

One or more embodiments can include a remote control device that can actuate the remote control assembly. The remote control device can permit the operator of the robot to remain outside of the arc flash zone. The remote control device can be a radio remote or wired pendant station with a cord.

In operation, the motor portion can be secured to a cabinet housing the isolation switch. The magnets can be rotated using the magnet handles, allowing the magnet faces to contact the cabinet housing to securely hold the motor portion to the cabinet housing.

The engagement portion of the gripper can be slid over a limit amp handle of the isolation switch, and the threadable member can be tightened to depress the interlock of the isolation switch; thereby allowing the limit amp handle to be operated.

The controller portion can be magnetically attached to the cabinet housing adjacent the motor portion.

The operator inspect the robot to ensure that the motor portion is properly installed on a limit amp handle.

The remote control assembly can be connected to the controller portion using the power and signal cable.

A pendant station attached to the remote control assembly can be used by the operator outside arc flash zone to control the robot. For example, the operator can push a "power on" button on the pendant station to turn on the remote control assembly.

The operator can push a "TRIP" button on the pendant station until the isolation switch opens in order to turn the isolation switch off.

If the switch is disconnected or off, the operator can push a "close" button on the pendant station until the isolation switch closes; thereby turning the isolation switch off.

Turning now to the Figures, FIG. 1 depicts a top view of a robot 8 for installing electrical components on electrical equipment, removing electrical components from electrical equipment, and allowing an operator to remain outside of an arc flash zone during installation and removal according to one or more embodiments.

The robot 8 can have a motor portion 6 and controller portion 7. The controller portion 7 can have a controller 70.

A gear box power and signal cable 73 can be engaged with a power and signal-out interface plug 72 on the controller 70 for transmitting power and control signals 75 from the controller portion 7 to a motor 10 of the motor portion 6.

A power and signal-in interface plug 74 of the controller 70 can be in communication with a remote switch operator through a power and signal cable 122 for receiving the power and control signals 75 therefrom.

The power and signal-in interface plug 74 can interface with a controller circuit board 77 through controller relays 79 of the controller 70 for transmitting the power and control signals 75 through to the gear box power and signal cable 73 and to the motor 10.

The motor 10 can operatively engage with a gear box 20. The motor 10 and gear box 20 can be contained in a housing 11 supported by a support plate 16.

The robot 8 can have a plurality of magnet housings, such as a first magnet housing 34a and second magnet housing 34b, both of which can be attached to the support plate 16.

Each magnet housing 34a and 34b can have a magnet, including a first magnet 36a in the first magnet housing 34a and a second magnet 36b in the second magnet housing 34b.

Each magnet 36a and 36b can be operatively engaged with a rotatable handle, including a first rotatable handle 38a operatively engaged with the first magnet 36a and a second rotatable handle 38b operatively engaged with the second magnet 36b.

The rotatable handles 38a and 38b can be configured to rotate the magnets 36a and 36b to extend the magnets 36a and 36b from within the magnet housings 34a and 34b for engagement with a metal or magnetic surface surrounding the electrical equipment to be operated upon. The magnets 36a and 36b can be used to hold the motor portion 6 to the metal or magnetic surface.

The robot 8 can have a first arm 40 and second arm 58, both of which can be rotatably engaged with a bidirectional rotatable shaft 12 of the gear box 20.

The second arm 58 can have an extension 64, which can be L-shaped.

An arm fastener 68 can hold the second arm 58 over the first arm 40, which can allow the second arm 58 to rotate freely on the bidirectional rotatable shaft 12.

The robot 8 can have a first stop 69 and second stop 59, which can both project from the support plate 16.

The first stop 69 can engage the first arm 40 to prevent of the first arm 40 from rotating past the first stop 69. The first stop 69 can be positioned to support the second magnet housing 34b.

The second stop 59 can be configured to engage the first arm 40 to prevent the first arm 40 from rotating past the second stop 59.

The first arm 40 can have a first gripper 54 and second gripper 56 engaged over opposite sides of the first arm 40 at a first arm end 50.

In operation, the robot 8 can be secured to a cabinet with the magnets 36a and 36b. A thumb screw of the second arm 58 can be engaged with a portion of a limit amp or the like. The motor 10 can receive the power and control signals 75 to control the gear box 20 to rotate the bidirectional rotatable shaft 12. The bidirectional rotatable shaft 12 can rotate the first arm 40 to operate a limit amp handle of the limit amp, such as to open or close the isolation switch of the limit amp.

Figure 2A:
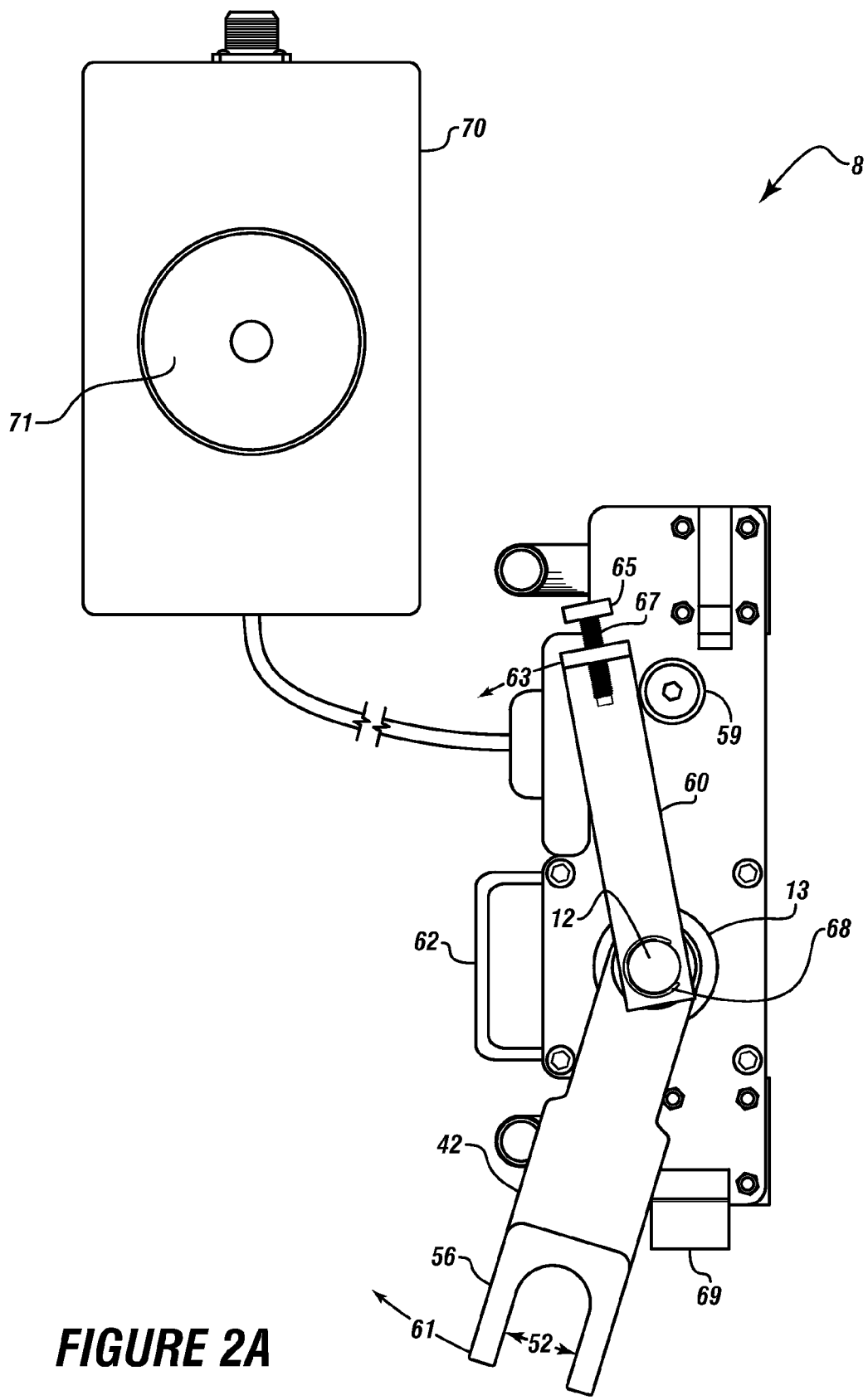
FIG. 2A depicts a side view of the robot according to one or more embodiments.
Figure 2B:
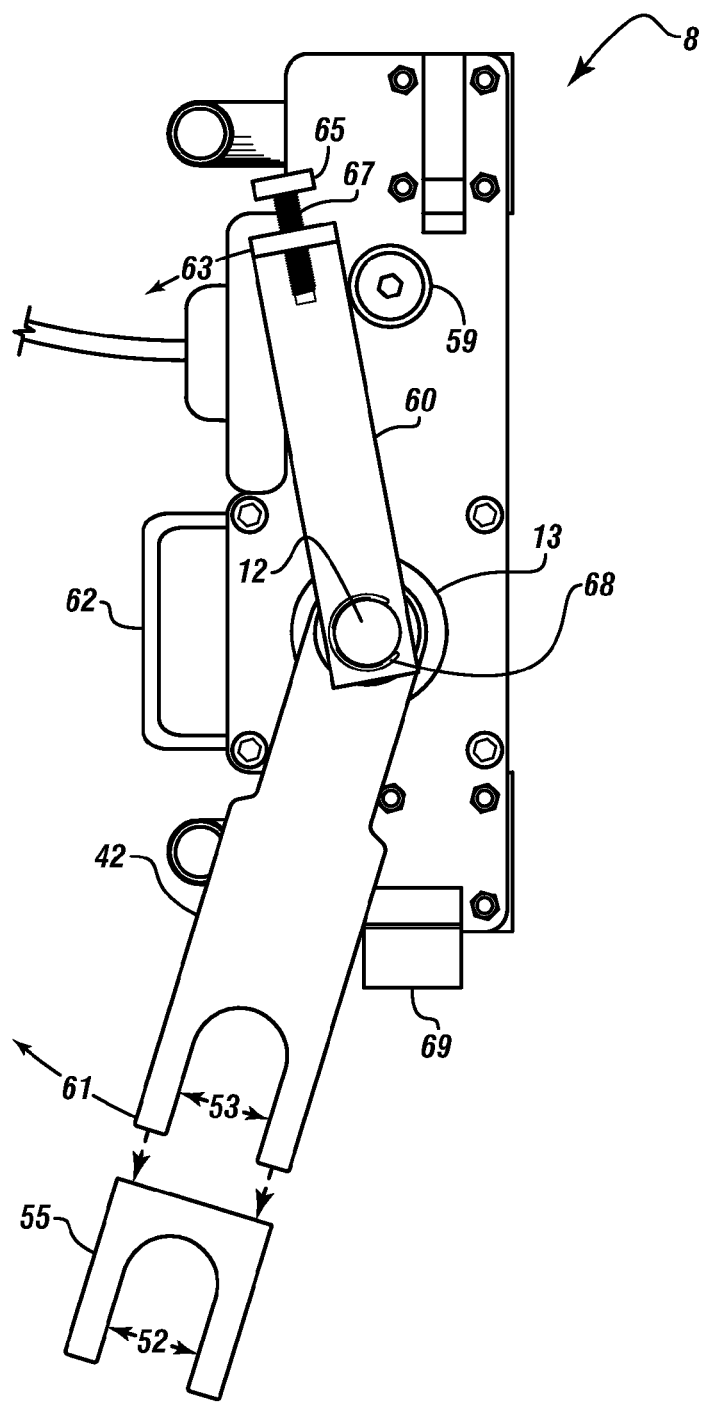
FIG. 2B depicts a detail of a first arm and gripper of the robot according to one or more embodiments.

FIG. 2A depicts a side view of the robot 8 showing a bottom view of the controller 70, and FIG. 2B depicts embodiment of the robot 8 showing a detail of the first arm with the first arm body 42 and a one-piece gripper 55 detached from the first arm body 42.

The controller 70 can have a controller magnet 71 configured to attach the controller 70 to metal and/or magnetic surfaces around the equipment to be operated upon.

The first arm can have a first arm body 42 connected at one end to the bidirectional rotatable shaft 12 by the arm fastener 68.

The bidirectional rotatable shaft 12 can extend from a hole 13 of the gear box.

The first gripper and the second gripper 56 can be disposed on the first arm body 42 opposite the arm fastener 68.

Each gripper can have an engagement portion 52 that can be configured to engage a motor starter or a similar customer electrical motor to be adjusted by the robot 8.

The second arm can have a second arm body 60 connected to the bidirectional rotatable shaft 12 using the arm fastener 68.

A threadable member, such as a knob portion 65 attached to a screw portion 67, can be threadably engaged through the extension of the second arm body 60.

The threadable member can be removable from the second arm body 60. For example, the knob portion 65 can be rotated to unscrew the screw portion 67 from the second arm body 60.

In operation, the first arm body 42 can be rotated along a first rotational arc 61 using the bidirectional rotatable shaft 12. The first stop 69 can prevent over-rotation of the first arm body 42 beyond the first stop 69, and the second stop 59 can prevent over-rotation of the first arm body 42 past the second stop 59.

The second arm body 60 can move along the second rotational arc 63 for positioning of the second arm.

A handle 62 can be mounted to the gear box for carrying the robot 8.

The first arm body 42 can have a first arm engagement portion 53.

The one-piece gripper 55 can be urethane, heavy, non-deforming, non-conducting, plastic, or combinations thereof.

The one-piece gripper 55 can be attached over the first arm engagement portion 53, such as with an adhesive, an epoxy, or a fastener, such as a LOCK-TITET™.

Figure 3:
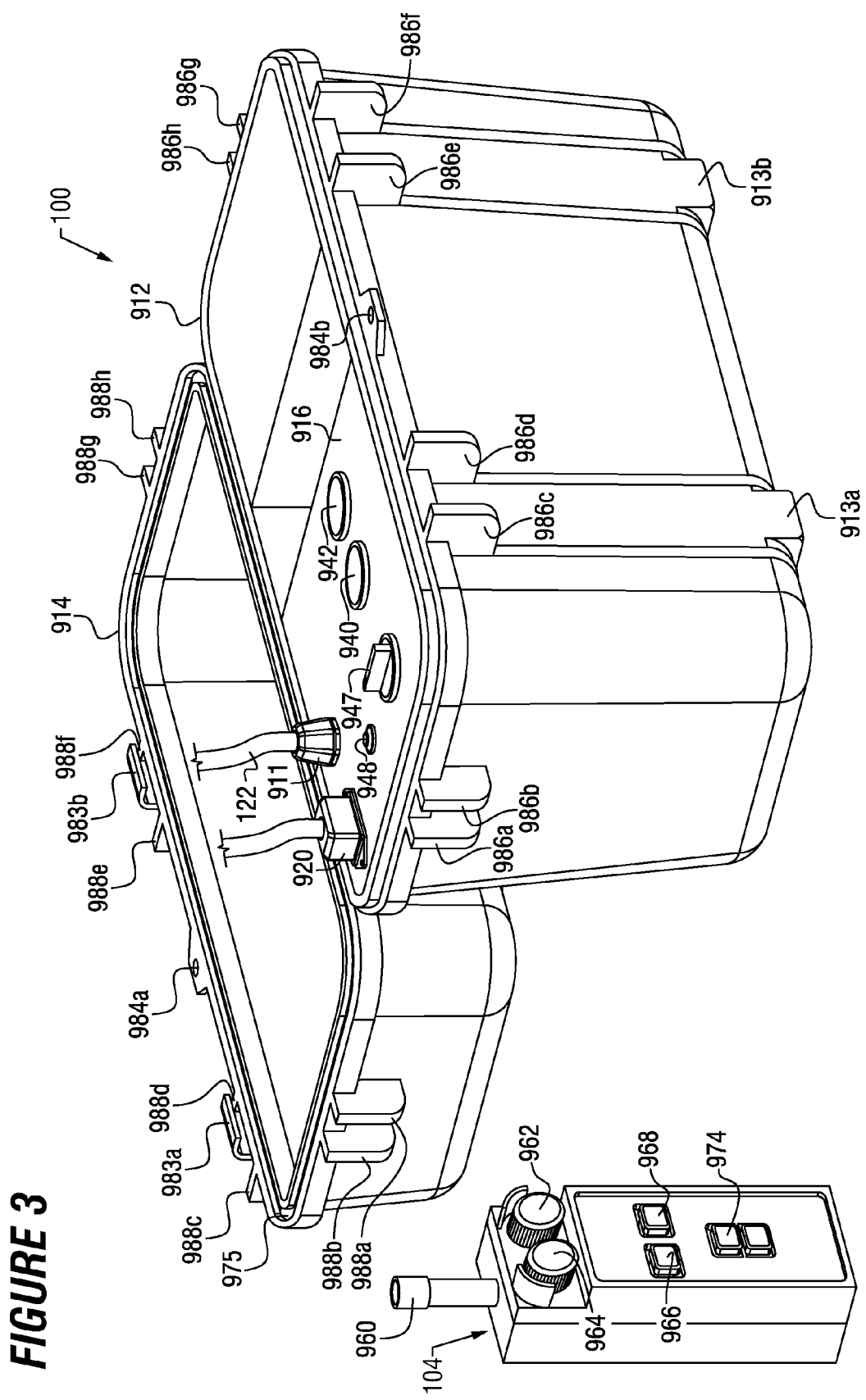
FIG. 3 depicts a remote switch operator usable with the robot.

FIG. 3 depicts an embodiment of a remote switch operator 100, which can be in communication with the controller through the power and signal-in interface plug.

The remote switch operator 100 can have a body 912 with a lid 914, which can be hinged to the body 912.

A face plate 916 can be mounted within the body 912, and can have a signal-in interface plug 911 that can receive commands from a pendant station or radio remote device 104.

The radio remote device 104 can provide signals to the remote switch operator 100 by communicating with a radio transmitters/receiver disposed in the body 912.

The remote switch operator 100 can provide power and control signals through the power and signal-in interface plug 911, through the power and signal cable 122, and to the controller portion of the robot.

The lid 914 can be opened and closed over the body 912 providing a watertight connection.

The body 912 can have one or more body ribs 986a, 986b, 986c, 986d, 986e, 986f, 986g, and 986h. The body ribs 986a-986h can provide support to the body 912.

The body 912 can have one or more feet 913a and 913b. The feet 913a and 913b can provide clearance from the ground, such as when the body 912 is placed near water or other substances.

The lid 914 can have one or more lid ribs 988a, 988b, 988c, 988d, 988e, 988f, 988g, and 988h. The lid ribs 988a-988h can provide support to the lid 914.

The lid 914 can have one or more latches 983a and 983b. The latches 983a and 983b can be used to attach the lid 914 to the body 912.

Connectors 984a and 984b can be used to permit a lock to securely lock the lid 914 to the body 912 in a tamper-proof manner.

The lid 914 can have a groove 975 that can retain a sealing member, such as an elastomeric gasket, to provide a sealed engagement between the lid 914 and body 912.

The face plate 916 can have an open momentary push button 942, close momentary push button 940, an on/off switch 947, and a circuit breaker 948.

The face plate 916 can have an A/C or D/C in power plug 920, which can receive electricity and transmit power to a battery charger connected to batteries in the body 912.

The remote switch operator 100 can provide electricity from batteries beneath the face place 916 to the motor portion of the robot.

The remote control device 104 can communicate with the remote switch operator 100 to control the remote switch operator 100 while allowing a human operator to remain outside of arc flash zones.

The remote control device 104 can have a remote off-button 964, remote on-button 962, remote close button 966, remote open button 968, an automatic shut off switch 974, and antenna 960.

Figure 4:
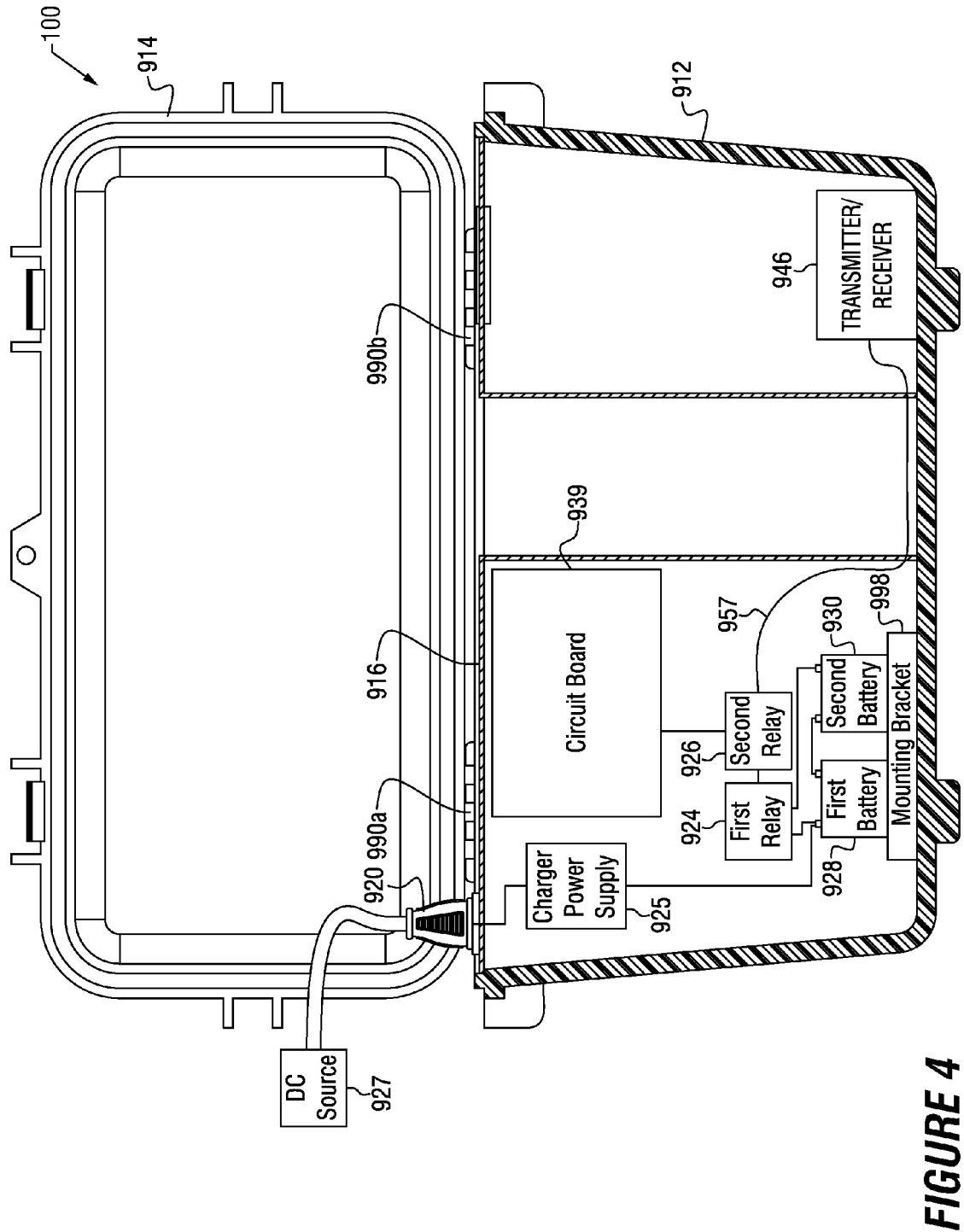
FIG. 4 depicts a cutaway view of the remote switch operator.

FIG. 4 depicts a cutaway view of the remote switch operator 100.

The lid 914 is depicted in an opened position relative to the body 912. The lid 914 can have one or more hinges 990a and 990b for movably engaging the body 912.

A transmitter/receiver 946 can transmit or receive signals from the remote control device, such as the radio remote device in FIG. 3. The transmitter/receiver 946 can be a radio transmitter/receiver. The transmitter/receiver 946 can be powered by a first battery 928 and second battery 930.

A second rely 926 can receive electricity and signals from the transmitter/receiver 946 through a cable 957. The second relay 926 can send the electricity and signals to a circuit board 939. The circuit board 939 can control the various electrical components under the face plate 916.

The second relay 926 can be in communication with a first relay 924. The second rely 926 can send electricity and signals from the transmitter/receiver 946 to the first relay 924.

The first relay 924 can be in communication with the first battery 928 and second battery 930 for sending electricity and signals from the transmitter/receiver 946 to the first battery 928 and second battery 930. The first battery 928 and second battery 930 can be in communication with each other, and can both be mounted to a mounting bracket 998.

The first battery 928 can be in communication with a charger power supply 925, which can be in communication with a DC source 927 through the power plug 920 for providing up to 27 volts to charge the first battery 928 and the second battery 930. The first battery 928 and second battery 930 can be 12 volt batteries.

While these embodiments have been described with emphasis on the embodiments, it should be understood that within the scope of the appended claims, the embodiments might be practiced other than as specifically described herein.

What is claimed is:

1. A robot for installing and/or removing electrical components from electrical equipment while allowing a human operator to remain outside of an arc flash zone, wherein the robot comprises:
    a. a motor portion comprising:
        i. a motor;
        ii. a gear box connected to the motor;
        iii. a bidirectional rotatable shaft extending from the gear box;
        iv. a gear box power and signal cable in communication with the motor and configured to provide power and control signals to the motor;
        v. a support plate connected to the motor, the gear box, or combinations thereof;
        vi. a plurality of removable magnetically shielding magnet housings attached to the support plate, wherein each removable magnetically shielding magnet housing comprises a non-electric magnet disposed therein, and wherein each non-electric magnet is engaged with a rotatable handle configured to rotate the non-electric magnet to extend the non-electric magnet from one of the removable magnetically shielding magnet housings to engage with a magnetic surface surrounding the electrical equipment and to hold the motor portion to the magnetic surface;
        vii. a first arm comprising:
            1. a first arm body connected to the bidirectional rotatable shaft having a first arm body end with a first arm engagement portion; and
            2. a gripper slidably disposed over the first arm body end, wherein the gripper has an engagement portion;
        viii. an arm fastener securing the first arm body to the bidirectional rotatable shaft;
        ix. a second arm comprising:
            1. a second arm body connected to the bidirectional rotatable shaft;
            2. an extension projecting from the second arm body; and
            3. a threadable member disposed through the extension; and
        x. a first stop and a second stop both projecting from the support plate, wherein each stop prevents over-rotation of the first arm;
    b. a controller portion in communication with the motor portion through the gear box power and signal cable, wherein the controller portion comprises:
        i. a controller comprising a controller circuit board and controller relays;
        ii. a controller magnet disposed on the controller and configured to attach the controller to the magnetic surface proximate the motor portion;
        iii. a power and signal-out interface plug in the controller portion for connecting to gear box power and signal cable; and iv. a power and signal-in interface plug in the controller for receiving power and signals;
c. a remote switch operator in communication with the controller portion through a power and signal cable, wherein the power and signal cable is engaged with the power and signal-in interface plug, and wherein the remote switch operator is configured to remotely control and power the motor portion through the controller portion; and
d. a remote control device in communication with the remote switch operator for controlling the remote switch operator while allowing the operator to remain outside of the arc flash zone.

2. The robot of claim 1, wherein the first stop is positioned to support one of the plurality of removable magnetically shielding magnet housings.

3. The robot of claim 1, wherein each rotatable handle is spring loaded for applying an outward pressure to the non-electric magnets and ensuring a flush and secure engagement between the non-electric magnets and the magnetic surface.

4. The robot of claim 1, wherein the engagement portion and the first arm engagement portion are C-shaped.

5. The robot of claim 1, wherein:
a. the first arm has a length ranging from 4 inches to 12 inches, a width ranging from ¼ of an inch to ¾ of an inch, and a thickness ranging from ⅛ of an inch to ¼ of an inch; and
b. the second arm has a length ranging from 4 inches to 12 inches, a width ranging from ¼ of an inch to 2 inches, and a thickness ranging from ⅛ of an inch to ¼ of an inch.

6. The robot of claim 1, wherein the motor portion weighs from 5 pounds to 20 pounds.

7. The robot of claim 1, wherein the controller portion weighs from 0.5 pounds to 3 pounds.

8. The robot of claim 1, wherein the controller portion is physically separated from the motor portion and only connected with the motor portion via the gear box power and signal cable.

9. The robot of claim 1, wherein the first arm and the second arm are made of: powder coated steel, rigid reinforced plastic, or a rigid material configured to not deform in the presence of temperatures of up to 105 degrees Fahrenheit.

10. The robot of claim 1, wherein the motor and the gear box are both contained in a housing supported by the support plate.

11. The robot of claim 1, wherein the support plate and the first stop are both made of rigid aluminum for providing lightweight rigorous support to the motor and the first arm.

12. The robot of claim 1, wherein the gripper is made of rubber or a non-conductive, rigid, and impact-resistant material.

13. The robot of claim 1, wherein the threadable member is removable from the extension.

14. The robot of claim 1, wherein:
a. the second stop is a solid metal rod projecting from a portion of the support plate opposite the motor;
b. the second stop has sufficient rigidity to prevent rotation of the first arm while the motor is rotating the bidirectional rotatable shaft in a first direction; and
c. the first stop is made of a material configured to prevent rotation of the first arm in a second direction.

15. The robot of claim 1, wherein the remote switch operator comprises:
a. a body and a closable lid;
b. a face plate within the body, wherein the face plate comprises a power plug, a close momentary push button, an open momentary push button, an on-off switch, and a circuit breaker;
c. a charger power supply connected to the power plug;
d. a circuit board beneath the face plate and engaged with two relays, wherein the two relays are engaged with at least one battery, and wherein the at least one battery is connected through the power plug to a power source for charging the at least one battery; and
e. a first cable configured to send signals between a transmitter/receiver in the body and one of the two relays, wherein the remote control device is in wireless or wired communication with the transmitter/receiver for remotely actuating the remote switch operator to actuate the robot while keeping the human operator out of the arc flash zone.

* * * * *